May 3, 1932. E. R. SMITH ET AL 1,856,196
TOOL SLIDE AND ACTUATING MECHANISM THEREFOR
Filed Oct. 22, 1929 2 Sheets-Sheet 2
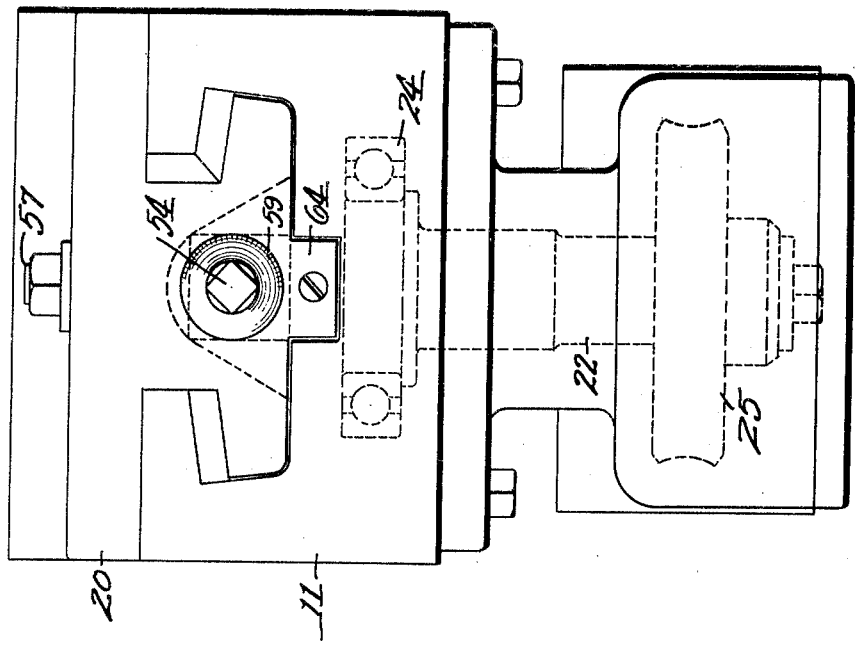
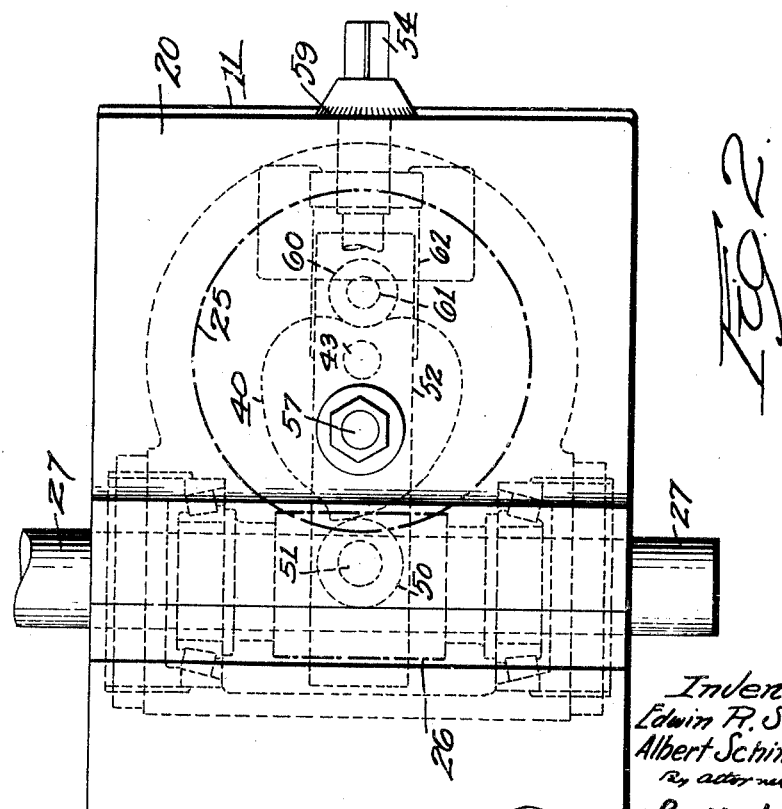
Inventors
Edwin R. Smith.
Albert Schinkez Patented May 3, 1932

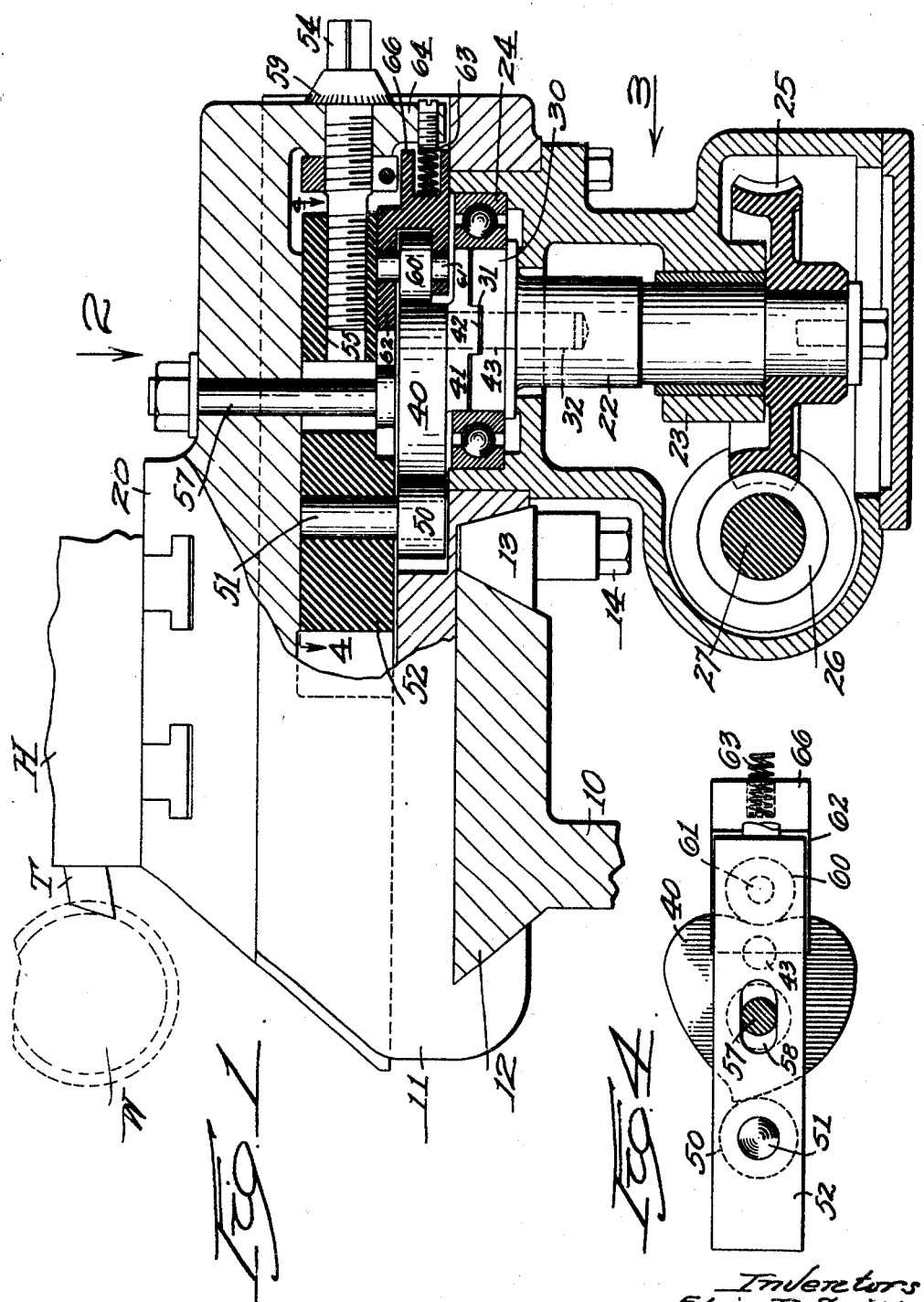

1,856,196

UNITED STATES PATENT OFFICE

EDWIN R. SMITH AND ALBERT SCHINKEZ, OF SENECA FALLS, NEW YORK, ASSIGNORS TO SENECA FALLS MACHINE COMPANY, OF SENECA FALLS, NEW YORK, A CORPORATION OF MASSACHUSETTS

TOOL SLIDE AND ACTUATING MECHANISM THEREFOR

Application filed October 22, 1929. Serial No. 401,555.

This invention relates to a tool slide for use in a lathe or similar machine tool.

It is the general object of our invention to provide an improved actuating mechanism for moving a tool slide toward or away from the work.

A more specific object is to provide actuating mechanism by which a tool slide may be positively advanced and positively withdrawn relative to the work and in which any lost motion while the tool is advancing toward the work will be yieldingly absorbed, preventing all irregular movement or chatter of the tool.

Our invention further relates to arrangements and combinations of parts which will be hereinafter described and more particularly pointed out in the appended claims.

A preferred form of the invention is shown in the drawings in which

Fig. 1 is a side elevation, partly in section, of our improved tool slide and actuating mechanism;

Fig. 2 is a partial plan view thereof, looking in the direction of the arrow 2 in Fig. 1;

Fig. 3 is a right hand end elevation thereof; and

Fig. 4 is a detail sectional view, taken along the line 4—4 in Fig. 1.

Referring to the drawings, we have shown a portion of the frame 10 of a lathe or other machine tool, on which a tool slide stand 11 is mounted. The frame is provided with a guiding portion 12 on which the stand is secured in desired adjusted position by a gib 13 and clamping screws 14. A tool T is mounted in any suitable tool holder H in position for engagement with the rotating work W.

The tool holder H is secured on a tool slide 20, which in turn is mounted in the stand 11 for sliding movement toward and away from the work W. A driven shaft 22 is mounted in bearings 23 and 24 in the rear portion of the stand 11, the upper bearing 24 being preferably of the ball or anti-friction type. A worm wheel 25 is secured to the lower end of the shaft 22 and is rotated by a worm 26 slidably keyed on a drive shaft 27 and rotated thereby from any suitable source of power.

At its upper end the shaft 22 is provided with an enlarged end 30 having a transverse slot or recess 31 formed in its upper surface and also having an axial recess 32. A cam 40 is provided with an under portion 41 having a rib 42 fitting the recess 31 and is also provided with a stud 43 fitting the axial recess 32. The cam 40 is thus definitely positioned on the head 30 of the shaft 22 and is positively rotated thereby.

A cam follower roll 50 is mounted on a stud 51 secured in a block 52, which is slidably mounted in the tool slide 20. An adjusting screw 54 is mounted for rotation but is held from axial movement in a bearing in the slide 20 and is threaded into a recess 55 in the block 52. The adjusting screw 54 may be provided with graduations 59 for determining the setting thereof if so desired. A clamping bolt 57 extends downward through an opening in the slide 20 and also extends through a slot 58 in the block 52 (Fig. 4).

The roll 50 on the block 52 may thus be adjusted accurately toward or away from the cam 40 and may be firmly secured in adjusted position by tightening the bolt 57. When thus adjusted and secured, the roll 50 is in effect mounted in fixed position on the tool slide 20.

A second cam follower roll 60 is mounted on a stud 61 in an auxiliary member 62, which is mounted for sliding movement in the slide 20 toward and from the cam 40. A spring 63 forces the member 62 and roll 60 yieldingly toward the cam 40 and a depending portion 64 of the slide 20 is positioned for engagement by a rear portion 66 of the member 62, thus limiting rearward movement of said member.

Having described the construction of our improved tool slide and actuating mechanism, the operation thereof will be readily apparent. When the slide is to be moved toward the work, the cam 40 acts on the front cam follower roll 50, positively forcing the tool toward the work. At the same time, the rear cam follower roll 60 is forced yieldingly against the opposite side of the cam 40, exerting a rearward pressure on the slide 20 and holding the cam follower roll 50 firmly against the face of the cam 40.

This application of yielding rearward pressure to the tool slide is found to be very effective in securing smooth and satisfactory performance of the tool T and in preventing the formation of chatter marks on the work.

When the tool slide is to be withdrawn, the cam 40 acts against the rear cam follower roll 60. If any substantial resistance to rearward movement of the slide is encountered, the auxiliary member 62 is moved slightly rearward against the pressure of the spring 63 until the portion 66 of said member engages the depending projection or abutment 64 on the slide 20. After such engagement, the roll 60 is positively positioned and the tool slide is positively moved rearward.

We have thus provided for positive movement of the tool slide in both directions, while at the same time providing for yielding engagement of the rear cam follower roll with the cam 40 during the forward or operative movement of the tool slide.

Having thus described our invention and the advantages thereof, we do not wish to be limited to the details herein disclosed, otherwise than as set forth in the claims, but what we claim is:—

1. In a machine tool, a stand, a tool slide mounted in guideways in said stand, an actuating cam for said slide, a cam follower positively positioned on said slide in front of said cam, and a second cam follower mounted on said slide and engaging the rear side of said cam, said second cam follower having a limited yielding movement on said slide.

2. In a machine tool, a stand, a tool slide mounted in guideways in said stand, an actuating cam for said slide having a peripheral operative face, a cam roll positively positioned on said slide in front of said cam and engaging said peripheral face, and a second cam roll yieldingly mounted at the rear of said cam and engaging said peripheral face at a point substantially opposite to the point of engagement by said first cam roll.

3. The combination in a machine tool as set forth in claim 2, in which means is provided to limit rearward yielding movement of said second cam roll.

4. The combination in a machine tool as set forth in claim 2, in which said second cam roll is mounted in a supporting member having a limited rearward sliding movement relative to said tool slide.

5. The combination in a machine tool as set forth in claim 2, in which said first roll is mounted on a block adjustably secured in said slide and in which means is provided for adjusting said block and for securing said block to said slide in adjusted position.

6. In a machine tool, a stand, a tool slide mounted in guideways on said stand, a driven shaft vertically mounted in said stand, said shaft having a transverse slot and an axial opening at its upper end, a cam for moving said tool slide, said cam being mounted at the upper end of said shaft and having portions fitting said transverse slot and said axial opening and thereby locating said cam on said shaft, and devices on said slide engaged by said cam to move said slide toward and from the work.

7. In a machine tool, a stand, a tool slide mounted in guideways in said stand, an actuating cam for said slide, a cam follower positively positioned on said tool slide and engaged by said cam to move said slide, and means self-contained on said slide effective to exert yielding rearward pressure on said slide and cam follower as said slide is advanced by said cam.

8. In a machine tool, a stand, a tool slide mounted in guideways in said stand, an actuating cam for said slide, a positively positioned cam follower on said slide at the front of said cam, and a second cam follower yieldingly positioned on said slide at the rear of said cam and means to yieldingly advance same against said cam during forward movement of said slide, said second follower being positively positioned in said slide when engaged by said cam to move said slide rearward.

9. In a machine tool, a stand, a tool slide movably mounted thereon, a cam rotatable about a fixed axis, a cam follower positively positioned on said slide in front of said cam and engaged thereby for forward movement of said slide, a second cam follower positioned on said slide at the rear of said cam, means to force said second cam follower yieldingly against said cam to seat said first cam follower firmly against said cam when said slide is moved forward, and an abutment to limit yielding movement of said second cam follower relative to said slide when said slide is moved rearward by said cam.

10. The combination in a machine tool as set forth in claim 9, in which said cam is mounted on a driven shaft in said stand and is rotated in a horizontal plane.

11. In a machine tool, a stand, a tool slide movably mounted thereon, a cam rotatable about a fixed axis, a pair of spaced cam follower rolls mounted on said slide and engaging opposite sides of said cam, yielding means effective to cause said rolls to seat firmly against said cam, and means to positively limit separation of said rolls to a slight amount during withdrawal of said tool slide.

12. In a machine tool, a frame, a tool slide stand in said frame, a tool slide mounted in guideways in said stand, an actuating cam for said slide positioned in said frame in predetermined relation to said slide, a cam follower positively positioned on said slide in front of said cam a second cam follower mounted on said slide and engaging the rear side of said cam, said second cam follower having a limited yielding movement on said slide.

13. In a machine tool, a frame, a tool slide stand in said frame, a tool slide mounted in guideways in said stand, an actuating cam for said slide positioned in said frame in predetermined relation to said slide, and having a peripheral operative face, a cam follower positively positioned on said slide in front of said cam, and engaging said peripheral face, a second cam follower mounted on said slide and engaging said peripheral face at a point substantially opposite to the point of engagement of said first follower.

14. In a machine tool, a frame, a tool slide stand in said frame, a tool slide mounted in guideways in said stand, an actuating cam for said slide positioned in said frame in predetermined relation to said slide, and having a peripheral operative face, a cam follower positively positioned on said slide in front of said cam, and engaging said peripheral face, a second cam follower mounted on said slide and engaging said peripheral face at a point substantially opposite to the point of engagement of said first follower, said second cam follower having a limited yielding movement on said slide.

15. In a machine tool, a stand, a tool slide mounted in guideways in said stand, an actuating cam for said slide having a peripheral operative face, a cam roll, means mounting said roll in fixed position on said slide in front of said cam, and in engagement with said peripheral face, means to adjust the relative position of said roll on said slide, a second cam roll yieldingly mounted at the rear of said cam and engaging said peripheral face at a point substantially opposite to the point of engagement by said first cam roll.

16. In a machine tool, a stand, a tool slide mounted in guideways in said stand, an actuating cam for said slide having a peripheral operative face, a cam roll, means mounting said roll in fixed position on said slide in front of said cam, and in engagement with said peripheral face, means to adjust the relative position of said roll on said slide, a second cam roll yieldingly mounted at the rear of said cam and engaging said peripheral face at a point substantially opposite to the point of engagement by said first cam roll, said means providing a limited yielding movement between said second cam roll and said slide.

In testimony whereof we have hereunto affixed our signatures.

EDWIN R. SMITH.
ALBERT SCHINKEZ.